United States Patent [19]

Abell et al.

[11] Patent Number: 5,043,064
[45] Date of Patent: Aug. 27, 1991

[54] APPARATUS TO COLLECT OIL AND OTHER WASTE MATERIAL FROM THE SURFACE OF WATER

[75] Inventors: Homer P. Abell; Warren K. Braun, both of La Grande, Oreg.

[73] Assignee: Evcon International, Ltd., La Grande, Oreg.

[21] Appl. No.: 455,522

[22] Filed: Dec. 21, 1989

[51] Int. Cl.⁵ .............................................. E02B 15/04
[52] U.S. Cl. ................................ 210/242.1; 210/242.3; 210/923
[58] Field of Search ................... 210/242.1, 242.3, 923, 210/776

[56] References Cited

U.S. PATENT DOCUMENTS

| | | | |
|---|---|---|---|
| 3,612,277 | 10/1971 | Van Stavern et al. | 210/923 |
| 3,617,555 | 11/1971 | Ginsburgh et al. | 210/923 |
| 3,656,624 | 4/1972 | Walton | 210/923 |
| 3,685,653 | 8/1972 | Van Stavern et al. | 210/923 |
| 3,693,805 | 9/1974 | Tillett et al. | 210/923 |
| 3,947,360 | 3/1976 | Fast | 210/242.3 |
| 3,968,041 | 7/1976 | De Voss | 210/923 |
| 4,060,487 | 11/1977 | Samsel | 210/242.3 |
| 4,456,536 | 6/1984 | Lorenz et al. | 210/242.3 |
| 4,515,299 | 4/1985 | Ayroldi | 210/923 |
| 4,555,338 | 11/1985 | Marchionda | 210/924 |
| 4,575,426 | 3/1986 | Littlejohn et al. | 210/924 |
| 4,769,142 | 9/1988 | Withnall | 210/924 |
| 4,834,880 | 5/1989 | Lundin | 210/923 |
| 4,842,735 | 6/1989 | Hollis et al. | 210/242.3 |
| 4,871,454 | 10/1989 | Lott | 210/407 |

FOREIGN PATENT DOCUMENTS 52-35369  3/1977  Japan.
55-5748   1/1980  Japan.
8706556  11/1987 PCT Int'l Appl.

Primary Examiner—Stanley S. Silverman
Assistant Examiner—Christopher Upton
Attorney, Agent, or Firm—Klarquist, Sparkman, Campbell, Leigh & Whinston

[57] ABSTRACT

The present invention discloses an apparatus for removing waste material, such as oil and/or debris, from the surface of water. A pair of hulls are interconnected by a deck structure. A perforated drum has a covering which is typically comprised of an oleophilic material. The covering in an alternative embodiment has bristles or brushes extending therefrom. The drum is mounted on the forward end of the hulls and may be rotated such that the lower end of the drum advances in the same direction as the direction of forward motion of the hulls. A sump is attached to the deck structure and is located between the hulls. A doctor blade contacts the covering of the drum to remove oil or debris from the drum for deposit into the sump. The sump in one embodiment has a liner which may be lifted from the sump when filled. An alternative embodiment utilizes a pump which pumps the collected oil or other waste material in the sump into floating collection containers.

7 Claims, 3 Drawing Sheets

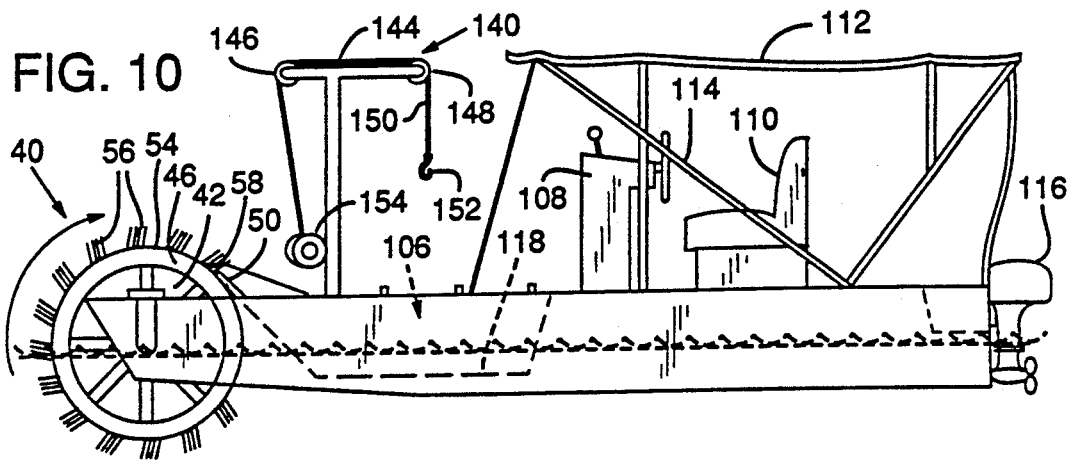
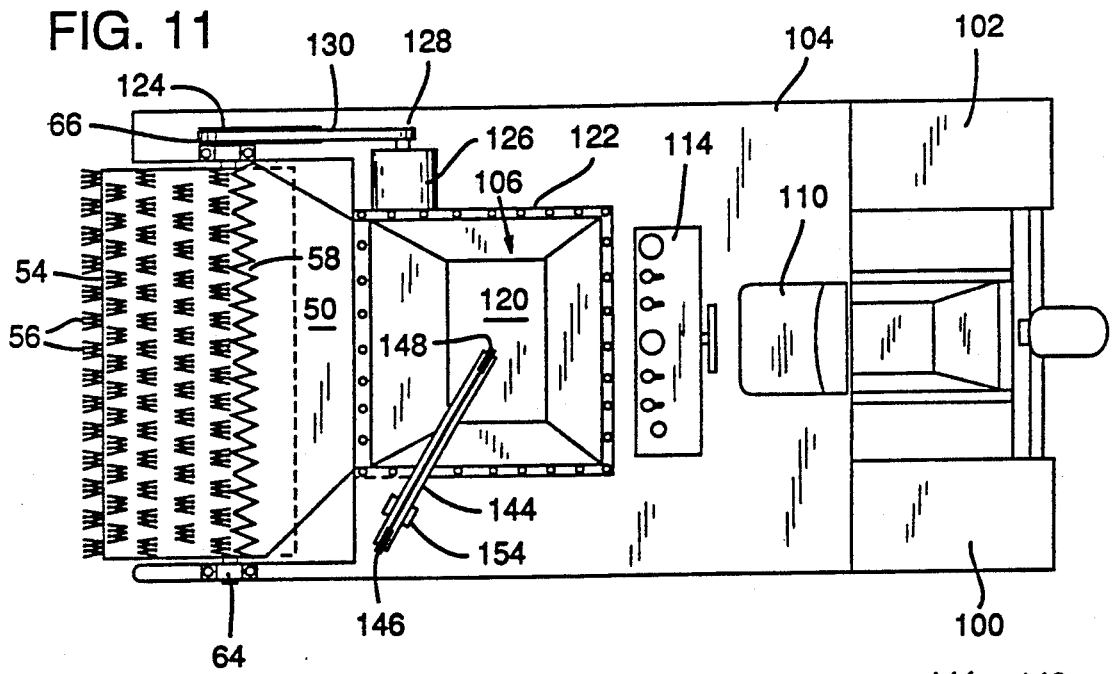
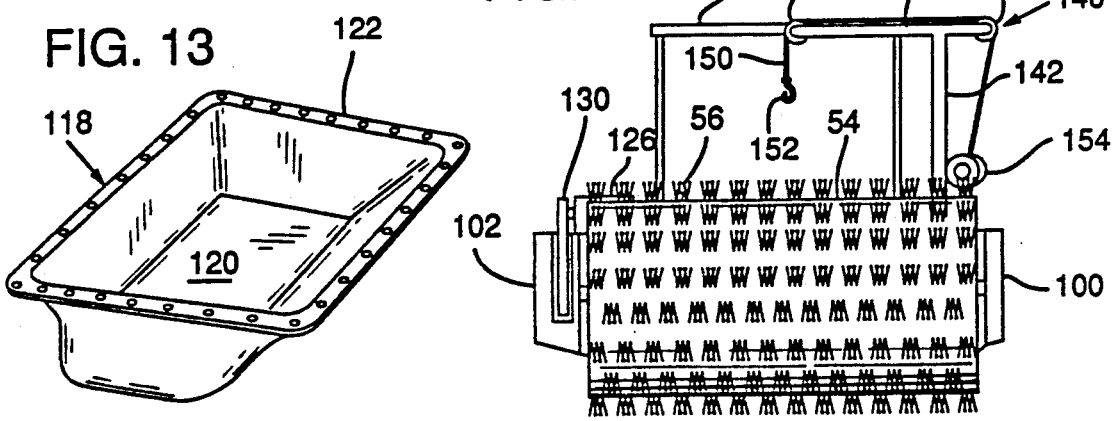

APPARATUS TO COLLECT OIL AND OTHER WASTE MATERIAL FROM THE SURFACE OF WATER

TECHNICAL FIELD

This invention relates to an apparatus for removing oil and other waste material from the surface of water.

BACKGROUND ART

Heretofore, there have been proposed a number of devices for mounting on floating vessels with rolls or drums which dip into an oil slick to collect oil floating on the surface of water. Generally, these drums are rotated while partially submerged in water and are covered with a material which has an affinity for oil. Devices, such as rollers, squeegees, or doctor blades are used to remove the oil from the surface of the rotating drum.

One of the problems with the previous drum-type oil collection apparatuses has been in separating the water from the oil to efficiently collect the oil. In many prior art devices, the surface of the drum which is out of the water rotates forwardly in a direction of travel of the apparatus. This tends to force surface oil and surface debris below the surface of the water where it can be more difficult or impossible to collect on the drum. As a result, oil tends to pass beneath the floating vessel rather than being collected. Problems are also encountered in removing collected oil from the surface of the drum and in offloading collected oil from the floating vessel.

A need also exists for an apparatus for collecting trash and oil from the surface of the water wherein the apparatus is small and maneuverable enough to be operated within a marina or other confined area.

SUMMARY OF THE INVENTION

One form of the present invention includes a floating structure comprised of a pair of spaced-apart-apart hulls designed to float on the water surface and which are interconnected by a deck structure. The hulls support, on the forward end thereof, an easily interchangeable partially submerged porous or perforated drum. The drum is in open communication at its ends with the water. Because of the perforations in the drum and open ends, water tends to flow through the drum and leave oil and debris on the surface of the drum during collection. The drum has an oleophilic covering to assist in the collection of oil. The drum is typically rotated by a separate motor. Preferably, the drum is rotated such that its submerged surface is advanced in the direction of forward movement of the floating structure. This assists in the collection of oil or debris from water in front of the floating structure without tending to force the debris beneath the surface of the water. A doctor blade in contact with the covering on the top surface of the rotating drum scrapes the oil and debris from the surface of the covering for delivery to a sump. The sump in one embodiment is lined by a removable bag or liner to facilitate the disposal of the oil and debris. In an alternative embodiment, oil is pumped from the sump into one or more floating oil containers which are detachably secured to the floating structure.

It is one object of the invention to provide an improved method and apparatus for collecting floating waste material, such as oil and/or debris from the surface of a body of water.

Another object of the invention is to provide an apparatus for collecting waste material from the surface of a body of water which aids in separating the water and waste material.

Still another object of the present invention is to provide an apparatus for collecting waste material from the surface of a body of water which minimizes the risk of waste material becoming submerged during the collection operation.

A further object of the invention is to provide a floating apparatus for collecting oil and debris from the surface of the water which has an improved collection and storage means.

It is another object of the invention to have an apparatus for collecting oil and debris from the surface of the water which has easily interchangeable drums adapted to collect oil or debris or both.

This invention relates to the above features and objects individually and in combination. Other objects, features and advantages of the present invention will be apparent from the following description of preferred embodiments thereof and from the attached drawings.

BRIEF DESCRIPTION OF DRAWINGS

FIG. 10 is a side view of an alternative embodiment of the present invention.

FIG. 11 is a top view of the embodiment of the invention shown in FIG. 10.

FIG. 12 is a front view of the embodiment of the invention depicted in FIG. 10.

FIG. 13 is a perspective view of a sump liner used in conjunction with the embodiment of the invention shown in FIG. 10.

DETAILED DESCRIPTION OF THE PREFERRED EMBODIMENT

Figure 1:
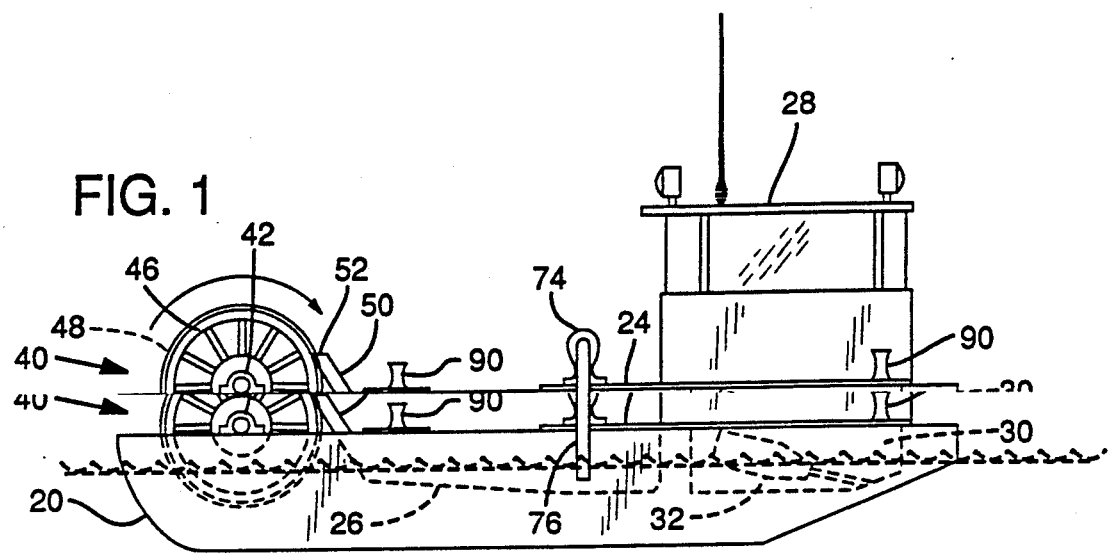
FIG. 1 is a side view of a first embodiment of the invention.
Figure 6:
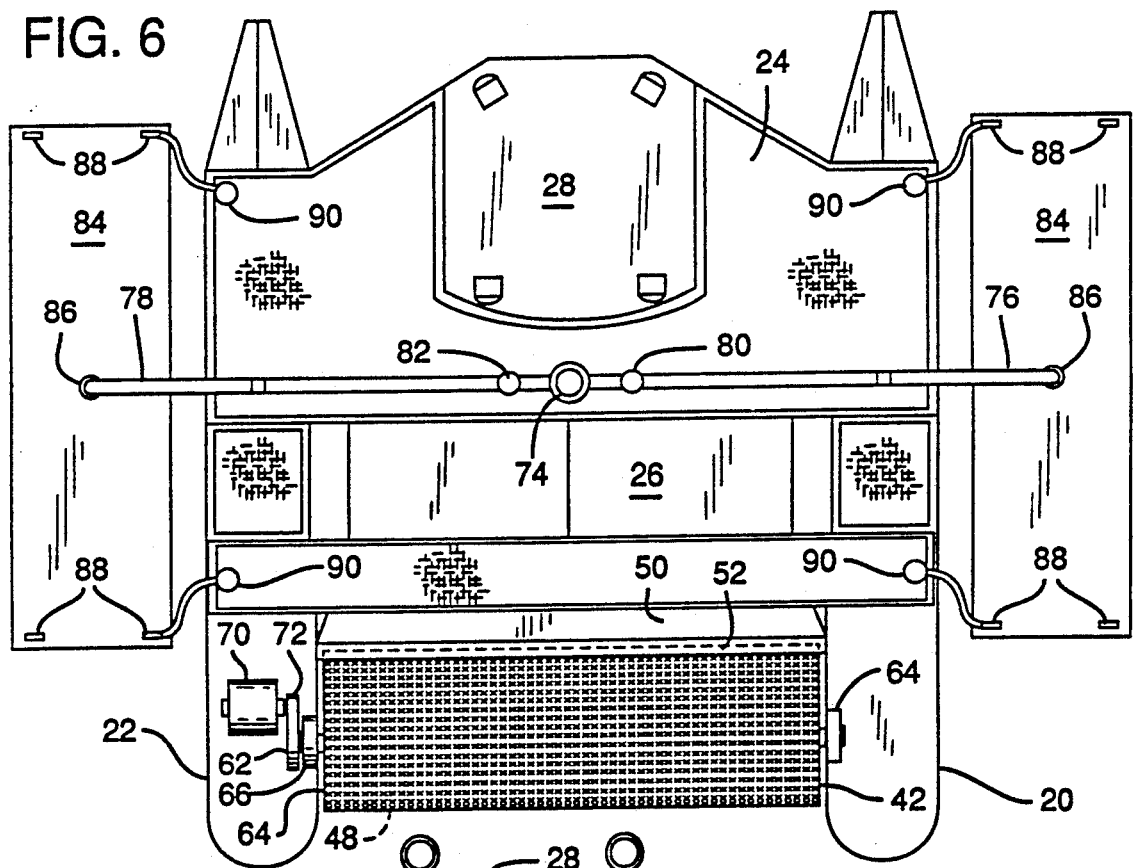
FIG. 6 is a top view of a first embodiment of the invention as shown in FIG. 1.
Figure 7:
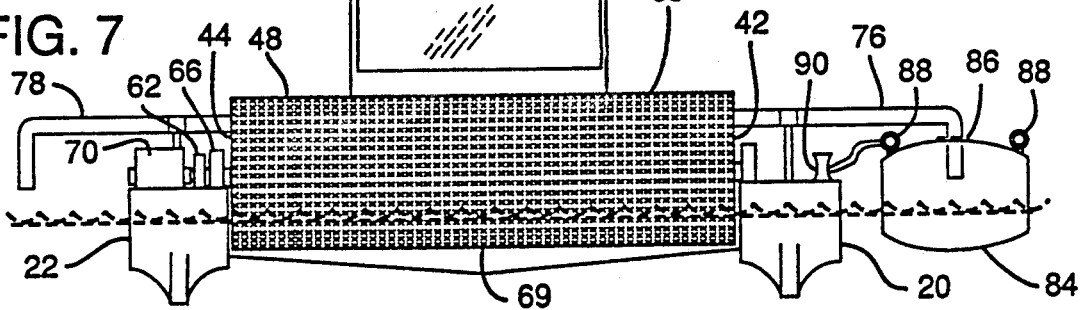
FIG. 7 is a front view of the first embodiment of the invention shown in FIG. 1.

Referring now to FIGS. 1, 6, and 7, a description of one embodiment of the invention will be detailed. A pair of hulls 20 and 22 are located in a spaced-apart parallel relationship to create a floating structure for floating on a body of water 23. A deck 24, preferably with a non-skid surface, interconnects the hulls 20 and 22 and maintains them in a fixed spaced-apart relationship. A recessed area or sump 26 is supported between the hulls by the deck 24. The sump 26 is used to contain waste material such as oil and debris collected by the apparatus. The floating structure also includes a pilot house 28 for housing the operator of the vessel and the controls for the vessel. An engine room 30, containing a propulsion engine 32, is also associated with pilot house 28. Although a self-propelled apparatus is preferred, the apparatus may be towed, rather than self-propelled. Alternatively, the apparatus may be stationary with waste material laden water directed past the apparatus.

A rotating drum assembly 40 is mounted on the forward portion of the hulls 20 and 22. The drum assembly 40 includes a drum or roll 41 which may be of a right cylindrical construction. The drum 41 has a first end 42 with openings therein and a second end 44 also having openings therein. The substantially open ends 42, 44 of the drum permits water to freely pass between the interior of the drum and the body of water. The drum may alternatively be sealed and buoyant. However, in this case, the water would not pass through the drum to its interior and then to the body of water.

Figure 2:
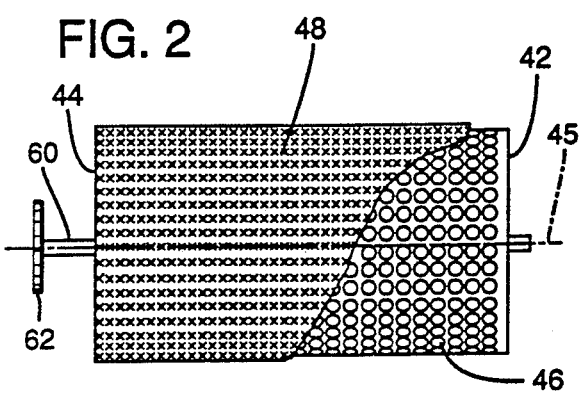
FIG. 2 is a partially broken away top view of one form of a rotating drum of the present invention.

Referring now to FIG. 2, one embodiment of the drum assembly 40 is shown in detail. The drum 41 has a shaft 60 extending along the longitudinal center line or axis 45 of the drum. A suitable drive gear 62 is mounted to the shaft 60. The external surface or shell of the drum is water permeable and may be porous or perforated as indicated by the holes 46. The perforations allow water to pass through the drum. Oil, debris and other waste material is separated from the water and retained on the drum as the water passes from the exterior to the interior of the drum. This construction assists in separating the waste material from the water. In a preferred embodiment of the invention, a water permeable or porous oleophilic covering 48 overlies and is mounted to the external surface of the drum. This covering 48 may comprise a porous backing fabric with a series of nylon loops. The nylon loops have an affinity for oil. The porous covering also allows water to readily pass. Other oleophilic coverings may be used, such as 3M oil sorbent sheet material from the 3M Company and a non-woven material of Vutec HH-442-H resin from Ergon, Inc. of Jackson, Miss. The coverings are not limited to these materials and may be water impermeable, as well as water permeable.

Referring again to FIGS. 1 and 7, it can be seen how the center line 45 of the drum assembly 40 may be supported in a position above the surface of the water on the forward portion of hulls 20 and 22. In this example, the lower portion 69 of the drum 41 is submerged in the water while the upper portion 68 of the drum assembly is above the surface of the water. A scraper blade assembly 50 includes a doctor blade which contacts the upper portion 68 of the drum assembly 40 to squeegee or scrape the oil from the surface of the drum. The doctor blade 52 is typically of metal, rubber, or plastic material. Any suitable mechanism may be used to assist in removing oil from the drum surface. Water picked up by the drum assembly tends to drain through the covering 48 and the perforations 46 of the drum to the interior of the drum. This water then returns to the water body through the openings in the drum ends 42 and 44. The oil which is scraped by the doctor blade 52 runs down the scraper blade assembly 50 into sump 26.

Figure 4:
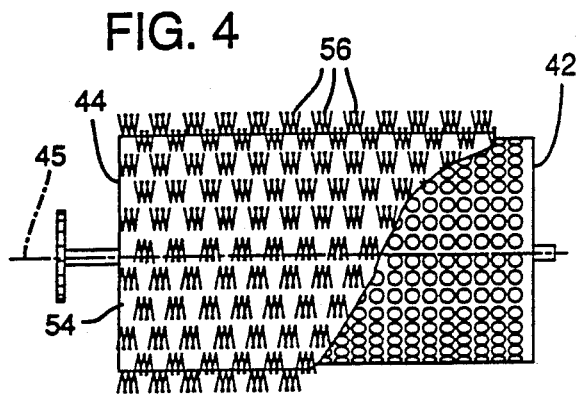
FIG. 4 is a partially broken away top view of an alternate embodiment of the rotating drum in accordance with the present invention.
Figure 3:
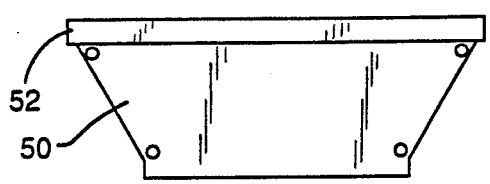
FIG. 3 is a top view of a scraper blade assembly in accordance with the present invention.
Figure 5:
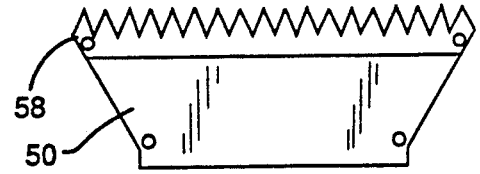
FIG. 5 is a top view of an alternative embodiment of a scraper blade assembly in accordance with the present invention.

Referring now to FIG. 4, another form of covering 54 is shown. The covering 54 supports a plurality of outwardly projecting trash gathering elements, such as tines, brushes or brush bristles 56. The bristles 56 are preferably, although not necessarily, embedded in or otherwise secured to the covering in such a manner that a major portion of the bristles angle upwardly from the water surface as they emerge from the water (see FIG. 10). Typically, the upward angle of inclination is about five degrees relative to the plane of the water surface. Consequently, the bristles tend to pick up solid debris, such as bottles, plastic bags, cans and other flotsam and jetsam. FIG. 5 shows a modified scraper blade assembly 50 with a doctor blade 58 with fingers or comb-like projections, in this case serrated teeth, which comb the bristles to remove the debris as the bristles pass by the blade.

The doctor blades 52, 58 may be heated to assist in removing oil from coverings 48, 54 by reducing the viscosity of the oil. Any suitable form of heater may be used, such as a propane fired heater 55 (FIGS. 1 and 6). Similarly, the sump may also be heated, such as by hot water from a propane fuel heater circulated under the sump, to make the oil easier to pump from the sump.

Referring now to FIG. 6, the drum assembly 40 may be rotatably mounted to the hull 20 by a suitable pillow block bearing 64. A similar pillow block bearing 66 rotatably mounts the shaft to the second hull 22 in a similar manner. If a buoyant drum is used, it may simply be coupled to the hulls for floating on the water body. A drive mechanism is provided for rotating the drum 41. For example, the drive mechanism may comprise suitable motor 70, mounted on hull 22 with a drive gear 72 in engagement with the gear 62 on the drum shaft 60. Motor 70 may rotate drum 41 in the direction shown by the arrow 43 in FIG. 1. The lower surface 69 of the drum assembly 40, in this case, is moved forward in the direction of travel of the floating structure during waste material collection. The forward-most portion of the drum 41 thus emerges from the water surface. This direction of motion tends to lift the waste material upwardly, rather than forcing the waste material downwardly below the surface of the water where it may be more difficult to collect. However, the drum may also be rotated in the opposite direction.

A pump 74 (FIG. 6) is mounted on the deck structure 24 and has a pick up tube (not shown) extending into the sump 26. A first delivery tube 76 and a second delivery tube 78 communicate with the pump assembly 74. A valve 80 is in line with delivery tube 76 and a valve 82 is in line with delivery tube 78. These valves are typically solenoid controlled, although they may also be manually or otherwise operated. Thus, the pump assembly 74 may deliver oil picked up from the sump 26 to either delivery tube 76, delivery tube 78, or to both delivery tubes, depending upon the position of the valves 80, 82. A floating storage container 84 is shown coupled to the delivery tube 76 in FIG. 7 while two such containers are shown in FIG. 6.

Figure 8:
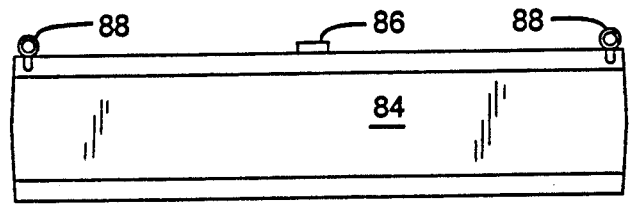
FIG. 8 is a side view of a form of buoyant waste material collection container used in conjunction with the invention, including with the embodiment shown in FIG. 6.

Referring now to FIG. 8, it can be seen how the floating storage containers 84 are typically of a generally rectangular shape, have a fill spout 86 on the top thereof, and mooring eyes 88 attached thereto. The containers can thus be easily tied to the floating structure while being filled with oil or other waste material. When a container is filled as desired, the container can be capped and detached from the floating structure. Another similar container can then be positioned and coupled to a delivery tube to receive the waste material. Empty containers may be towed by the structure and moved into a position for filling as desired. The detached and filled floating containers may be subsequently collected, as by a tug, and towed or otherwise transported to a waste material transfer or processing site.

Figure 9:
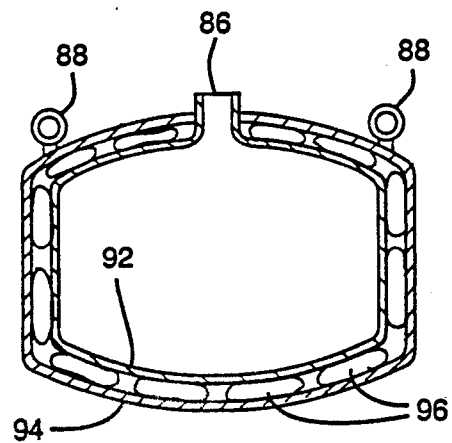
FIG. 9 is a cross-section of the buoyant collection container taken along lines 9—9 of FIG. 8.

Referring now to FIG. 9, a preferable form of floating storage container 84 comprises a dual compartment container having an inner wall 92 and an outer wall 94. The walls are fluid tight and are made of any suitable material. The walls may be of, for example, a flexible material and the material may be corrosion resistant to resist damage by the collected waste material and by saltwater in the event the containers are used in marine environments. One suitable material is neoprene rubber. The dual walls also minimize the risk of leakage of the collected waste material as a double barrier is provided. A floatation material 96 fills the space between the inner wall 92 and the outer wall 94 to provide sufficient flotation to float the container, even when the storage container is filled with collected oil or other waste material.

Cleats 90 are typically provided on the deck structure 24 of the floating structure for use in attaching the oil collection containers to the deck by means of rope or wire through mooring eyes 88.

Referring now to FIGS. 10, 11, and 12, which show an alternative embodiment of the floating structure. In this embodiment, two hulls 100 and 102 are again interconnected by a deck structure 104 This alternative embodiment may be substantially smaller than the first embodiment for use in confined areas, such as marinas. The deck structure again supports a preferably watertight sump 106. The deck structure may also support a control console 108 and an operator's seat 110. A canopy 112 may be provided for inclement weather and is supported by a suitable support means 114. In this embodiment of the invention, an outboard motor 116 is typically used for propulsion.

Sump 106 has a sump liner 118 which may be of a pliable, oil-resistant, water-tight material, such as neoprene, molded to conform to the shape of the sump 106. The sump liner has a bottom 120 and a flange 122, as can be seen in FIG. 13.

In this illustrated embodiment, the form of drum 41 having the bristles 56 is shown mounted to the hulls. A motor assembly 126, having a drive sprocket 128, drives a chain 130, which interconnects with a sprocket on the rotating drum assembly, to thereby rotate the drum to pick up debris.

As can be seen, a doctor blade 58 is mounted in position to remove the debris from the covering 54 of the drum 41 as the drum rotates in the direction of the arrow 43 shown in FIG. 10. This debris is deposited by the blade into the sump liner 118. After the sump liner 118 has been filled with debris, it can be easily removed by use of a gantry assembly.

The gantry assembly may comprise a vertical post 142 which supports a horizontal beam 144. Each end of the beam is provided with a suitable pulley 146 and 148 about which a wire rope 150 is wrapped. The bitter or distal end of the wire rope has a lifting sling or hook 152. The other end of the wire rope is wrapped about a suitable winch 154. To remove the debris, one merely needs to detach the flange 122 of the sump liner, attach hook 152 to the liner and lift the entire liner by means of the winch 154. The beam 144 may be rotated about post 142 to swing the liner 118 away from the floating structure, such as to shore or to a transfer vessel.

OPERATION

Although not required, if the material to be collected is liquid waste material, such as oil from an oil spill or diesel from a diesel fuel spill, the embodiment of the drum 41 shown in FIG. 2 is typically used. If, however, debris or other material is to be collected from the surface of the water, the alternative embodiment of the drum assembly shown in FIG. 4 is typically used. The drum assemblies are easily interchangeable because they are held by pillow block bearings 64 and 66 having only two bolts each for attachment. In operation, motor 70 or motor 126 is used to rotate the drum assembly. Again, rotation is typically in a direction such that the lower surface of the drum assembly moves forward in the direction of travel of the floating structure to collect the oil or debris and carry the collected waste material up and over the top of the drum assembly. Should either cover 48 or 54 become damaged or soiled to the point that it is no longer effectively collecting the waste material, the drum assembly may be easily removed and the covering replaced.

Of course, it should be understood that a wide range of changes and modifications can be made to the preferred embodiment described above. It is, therefore, intended that the foregoing descriptions be regarded illustrative rather than limiting, and that it be understood that it is the following claims, including all equivalents, which are intended to define the scope of the invention.

We claim:

1. An apparatus for collecting debris from the surface of water comprising:
   a pair of spaced-apart hulls;
   a deck structure mounted to said hulls;
   means for propelling said hulls in a forward direction of travel;
   a sump supported by said deck structure, said sump being located between said hulls;
   a rotatable drum having an external surface with upper and lower portions and a longitudinal center line;
   means for rotatably mounting the drum to said hulls in a partially submerged position with at least a portion of the lower surface being positioned in the water, at least a portion of the upper surface being positioned out of the water, and with the longitudinal center line of the drum extending in a direction across the space between the hulls;
   debris collecting brushes, tines or bristles mounted to and projecting outwardly from the external surface of said drum;
   means for rotating said drum; and
   comb means positioned to engage the debris collecting brushes, tines or bristles for removing debris therefrom and for directing the debris to the sump; and
   said means for rotating said drum comprising means for rotating said drum such that the lower external surface of said drum advances in the same direction as the forward direction of travel of said hulls.

2. An apparatus for collecting debris according to claim 1 including a sump liner located in said sump to receive said debris and means for lifting said sump liner from said sump for removal of said debris.

3. An apparatus for collecting oil as recited in claim 1 including means for heating the comb means.

4. An apparatus for collecting debris according to claim 1 in which said comb means includes plural projections positioned to engage the debris collecting bristles, tines or brushes for removing debris from the bristles, tines or brushes and for directing the debris to the sump.

5. A waste material collection drum for rotatably mounting to a support floating on a body of water with the drum being at least partially submerged in the water, the drum comprising a shell having trash gathering elements projecting outwardly form the shell, the drum being mounted to the support with the trash gathering elements projecting from the shell so as to angle upwardly at a first angle relative to the surface of the water as the trash gathering elements emerge from the liquid during rotation of the drum, the trash gathering elements comprising brushes, tines or bristles at least a majority of which project upwardly at the first angle.

6. An apparatus for collecting debris from the surface of water comprising:
   a pair of spaced-apart hulls;
   a deck structure mounted to said hulls;
   means for propelling said hulls in a forward direction of travel;
   a sump supported by said deck structure, said sump being located between said hulls;
   a rotatable drum having an external surface with upper and lower portions and a longitudinal center line;
   means for rotatably mounting the drum to said hulls in a partially submerged position with at least a portion of the lower surface being positioned in the water, at least a portion of the upper surface being positioned out of the water, and with the longitudinal center line of the drum extending in a direction across the space between the hulls;
   debris collecting brushes, tines or bristles mounted to and projecting outwardly from the external surface of said drum;
   means for rotating said drum;
   comb means positioned to engage the debris collecting brushes, tines or bristles for removing debris therefrom and for directing the debris to the sump; and
   the drum being rotatably mounted to said hulls and the brushes, tines or bristles projecting from the drum so as to angle upwardly at a first angle relative to the surface of the water as the trash gathering elements emerge from the liquid during rotation of the drum.

7. An apparatus for collecting debris according to claim 6 in which said comb means includes plural projections positioned to engage the debris collecting bristles, tines or brushes for removing debris from the bristles, tines or brushes and for directing the debris to the sump.

* * * * *

UNITED STATES PATENT AND TRADEMARK OFFICE
CERTIFICATE OF CORRECTION

PATENT NO. : 5,043,064

DATED : August 27, 1991

INVENTOR(S) : Homer P. Abell et al.

It is certified that error appears in the above-identified patent and that said Letters Patent is hereby corrected as shown below:

Line 2, Abstract, "debris, from" should be --debris from--;

Column 1, line 41, "spaced-apart-apart" should be --spaced-apart--.

Column 5, line 27, "104 This" should be "104. This--.

Column 7, line 12, "form" should be --from--.

Signed and Sealed this

Thirty-first Day of January, 1995

Attest:

BRUCE LEHMAN

Attesting Officer

Commissioner of Patents and Trademarks